March 22, 1927.

J. H. HUNT 1,622,145

GENERATOR REGULATING APPARATUS

Filed Dec. 12, 1923

Inventor
John H. Hunt.
By Spencer, Sewall, & Hardman.
His Attorneys

Patented Mar. 22, 1927.

1,622,145

UNITED STATES PATENT OFFICE.

JOHN H. HUNT, OF DAYTON, OHIO, ASSIGNOR TO GENERAL MOTORS RESEARCH CORPORATION, OF DAYTON, OHIO, A CORPORATION OF DELAWARE.

GENERATOR-REGULATING APPARATUS.

Application filed December 12, 1923. Serial No. 680,240.

This invention relates to variable speed electrical generators and includes among its objects to provide for the regulation thereof so that for example, the voltage or current of the generator will remain constant throughout a wide range of speed variation.

In one of its forms the invention includes a dynamo having a permanent magnet field which cooperates with certain short circuited windings of the dynamo armature. By virtue of these windings the armature reactance causes certain magnetic circuits to be created which link the pole pieces of the field with the armature. This induced field cooperates with other windings of the armature to cause the generation of electric current for a work circuit. The dynamo is regulated by means of an electromagnet which tends to divert magnetism of the permanent magnet field away from the armature. This electromagnet is excited in accordance with the voltage across the work circuit in order to effect constant voltage regulation, or the electromagnet may be excited by the coils in series with the work circuit to effect constant current regulation.

Further objects and advantages of the present invention will be apparent from the following description, reference being had to the accompanying drawings, wherein a preferred form of embodiment of the present invention is clearly shown.

Figure 1:
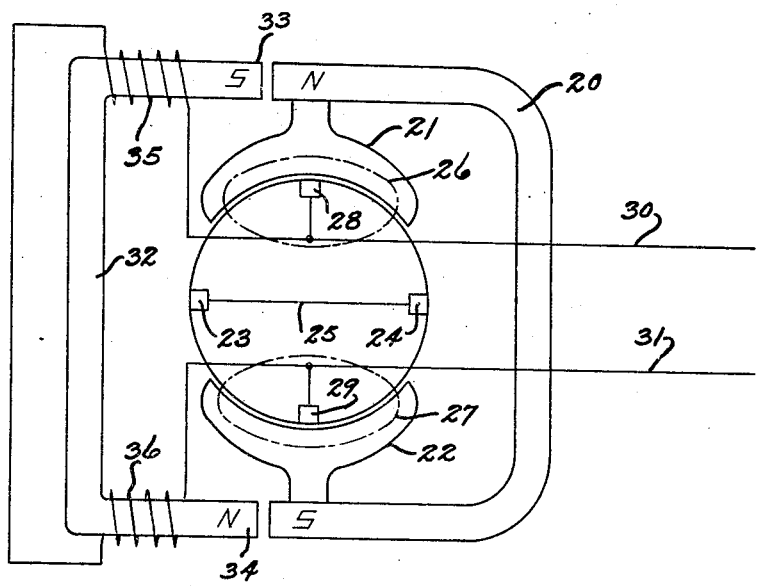
Fig. 1 is a wiring diagram showing a form of the invention constructed for voltage regulation.

In the drawings, 20 designates a permanent magnet which is substantially saturated and parts 21 and 22 are magnetizable pole pieces. During revolution of the armature certain armature coils are short circuited by means of commutator brushes 23 and 24 connected by wire 25. The currents in the windings connected with these brushes are induced by the virtue of the magnetism produced by the permanent magnet 20 and these short circuit currents produce armature reaction of such a nature as to induce magnetic flux paths which are represented by the dot and dash line loops 26 and 27. At the time certain armature windings are being short circuited by the brushes 23 and 24 other windings are crossing the flux paths 26 and 27 and currents are being generated in these windings which are being conducted by means of the main brushes 28 and 29 connected, respectively, with the work circuit wires 30 and 31.

This form of generator possesses inherent regulation since an increase in speed tends to increase the intensity of the induced fields 26 and 27 to such an extent as to cause some of the magnetism of these fields to oppose the magnetism of the permanent magnet field 20 and thereby cut down the armature reactance which induces the fields 26 and 27. Under certain conditions the magnetism of the permanent magnet 20 might be entirely overcome and therefore its magnetism would be destroyed.

Figure 2:
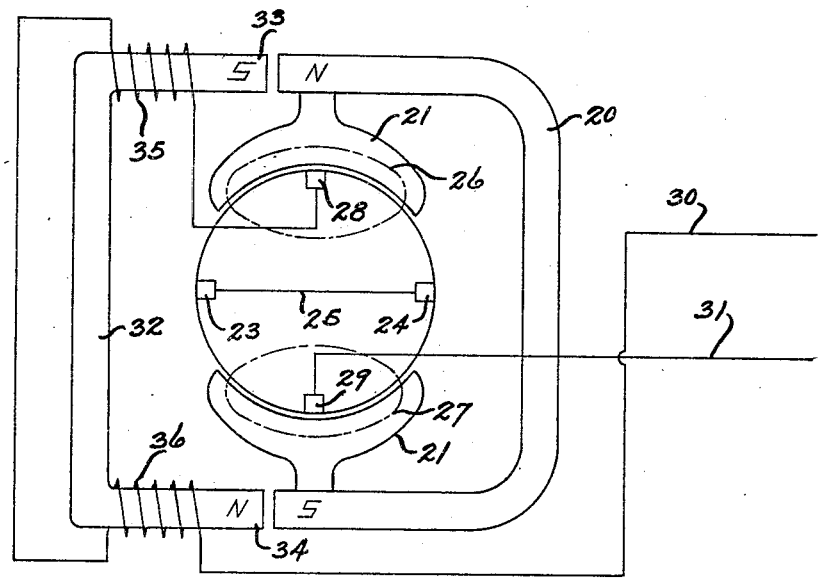
Fig. 2 is a wiring diagram showing the construction for current regulation.

The present invention however includes means for providing fairly close regulation of a generator without bucking the flux of its main exciting field so that the tendency to de-magnetize the field when a permanent magnet is used can be eliminated. This means includes an electromagnet having a yoke 32 and poles 33 and 34 surrounded by windings 35 and 36 respectively, which are connected with the work circuit wires 30 and 31 as voltage windings as shown in Fig. 1 or are connected in series with one of the main brushes and one of the work circuit wires so that regulation may be for constant current as shown in Fig. 2. The windings are so disposed that the polarity of the poles 33 and 34 are opposite in magnetic sign to the magnetic sign of the adjacent poles of the permanent magnet 20. Therefore, as the current in the windings 35 and 36 tends to increase as the speed increases the electromagnet will draw flux from the permanent magnet 20 thereby rob the armature circuits connected with brushes 23 and 24 of exciting flux, consequently, the armature reactance tends to be reduced and the induced fields 26 and 27 are kept within the proper limits. The relation of the dimensions of the air gap between the electromagnet poles and the permanent magnet poles and the air gap between the armature and poles 21 and 22 is determined by what generator characteristics are desired. Generally speaking the gaps adjacent the electromagnet poles are so provided that at low speeds substantially no flux of magnet 30 will be diverted from the armature but at higher speeds when the excitation on the auxiliary windings 35 and 36 is increased, more and more of the flux of the permanent magnet will be diverted from the poles 21 and 22 into the auxiliary magnetic circuit 32.

While the present invention has been shown in connection with a certain type of generator having inherent regulation which depends on the cooperation of magnetism of a main exciting field with the magnetism of fields produced by armature reaction, it is to be understood that the invention is susceptible of other uses. However, it is pointed out that the present invention is particularly adapted for providing close regulation for a dynamo of this type. On account of the possibility of reversal of the flux of the main exciting field, generators of the type disclosed are provided with separate field excitation as heretofore the use of permanent magnet field has been impractical on account of the liability of de-magnetization. The present invention however permits the use of a permanent magnet field for exciting the short circuited windings in the armature. By use of the present invention close regulation can be obtained without carrying on the inherent regulation of the dynamo to such an extent that de-magnetization could occur. In other words, the windings of the dynamo can be constructed so that approximate inherent regulation can be obtained. To provide closer regulation, this inherent regulation is supplemented by a form of the present invention without danger of demagnetizing the permanent magnet field.

While the form of embodiment of the present invention as herein disclosed, constitutes a preferred form of embodiment, it is to be understood that other forms might be adopted, all coming within the scope of the claims which follow.

What is claimed is as follows:

1. A generator comprising, in combination, a field magnet, an armature, a magnetizable core which is stationary relative to the field magnet and has its poles located respectively adjacent the field magnet poles but spaced therefrom to provide a magnetic path in parallel with the armature which path normally is of greater reluctance than the magnetic path between the field magnet poles through the armature, and a coil connected with the armature for magnetizing said core so that its poles will be adjacent, respectively, unlike poles of the field magnet, the flux produced by said coil being alone sufficient to divert substantial quantities of flux of the field magnet from the armature in order to regulate the generator.

2. A generator according to claim 1, in which the width of the air gaps between the field magnet and the regulating magnet core is greater than the gaps between the field magnet and the armature.

3. A generator according to claim 1, in which the field magnet is a permanent magnet and the regulating magnet provides a flux path in series with all of the field magnet thereby tending to keep the field magnet magnetized.

4. A generator comprising, in combination, a substantially saturated permanent magnet, relatively large magnetizable pole pieces in contact with the poles of the permanent winding, an armature rotatable between the pole pieces, means for short-circuiting armature windings when in a certain position of rotation to produce a magnetization of the pole pieces in addition to that produced by the permanent magnet, and an electromagnet having its coil connected with the armature and its poles adjacent the poles of the permanent magnet but spaced therefrom, unlike poles being adjacent, the ampere turns of the magnet coil being sufficient alone to divert substantially the flux of the permanent magnet from the armature in order to regulate the generator and to prevent demagnetization of the permanent magnet by limiting the flux produced in the pole pieces by the short-circuited armature conductors.

In testimony whereof I hereto affix my signature.

JOHN H. HUNT.